United States Patent
Letor et al.

(10) Patent No.: US 11,570,697 B2
(45) Date of Patent: Jan. 31, 2023

(54) WIRELESS ACCESS POINT AND METHOD FOR PROVIDING BACKUP NETWORK CONNECTIONS

(71) Applicant: InterDigital CE Patent Holdings, Paris (FR)

(72) Inventors: Nicolas Letor, Zemst (BE); Koen Van Oost, Borsbeek (BE)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 21 days.

(21) Appl. No.: 17/043,249

(22) PCT Filed: Mar. 21, 2019

(86) PCT No.: PCT/EP2019/057075
§ 371 (c)(1),
(2) Date: Sep. 29, 2020

(87) PCT Pub. No.: WO2019/185443
PCT Pub. Date: Oct. 3, 2019

(65) Prior Publication Data
US 2021/0022070 A1    Jan. 21, 2021

(30) Foreign Application Priority Data

Mar. 30, 2018 (EP) .................................. 18305366

(51) Int. Cl.
*H04W 4/00* (2018.01)
*H04W 48/16* (2009.01)
(Continued)

(52) U.S. Cl.
CPC ............ *H04W 48/16* (2013.01); *H04L 45/28* (2013.01); *H04W 40/22* (2013.01); *H04W 48/14* (2013.01); *H04W 84/12* (2013.01)

(58) Field of Classification Search
CPC ..... H04W 48/14; H04W 48/16; H04W 40/22; H04W 84/12; H04L 45/28
(Continued)

(56) References Cited

U.S. PATENT DOCUMENTS

| 8,094,569 B2 | 1/2012 | Gunukula et al. |
| 8,175,079 B2 | 5/2012 | Alapuranen et al. |

(Continued)

FOREIGN PATENT DOCUMENTS

| CA | 2930622 A1 | 11/2016 |
| CN | 105721191 A | 6/2016 |

(Continued)

OTHER PUBLICATIONS

Anonymous, "IEEE Standard for Information Technology - Telecommunications and Information Exchange Between Systems - Local and Metropolitan Area Networks - Specific Requirements - Part 11: Wireless LAN Medium Access Control (MAC) and Physical Layer (PHY) Specifications - Rediine", IEEE Std 802.Nov. 2007 (Revision of IEEE Std 802.Nov. 1999), Jun. 12, 2007, p. 128.

(Continued)

*Primary Examiner* — Temica M Beamer
(74) *Attorney, Agent, or Firm* — Volpe Koenig

(57) ABSTRACT

At least one hardware processor (111) in a wireless access point (110) in a first local network (120) managed by the wireless access point (110) routes traffic between wireless devices (121, 122) in the first local network (120) and a second network via a first interface (113, 114) configured for communication with wireless devices (121, 122) in the first local network (120) and a second interface (115) configured for communication with the second network and, upon determination that communication via the second interface (115) is impossible, connects (S460) through a third interface (113, 114) to a second wireless access (130) point as a (Continued)

wireless device in a second local network (140) managed by the second wireless access point (130) and routes (S470) traffic between the wireless devices (121, 122) in the first local network (120) and the second network via the first interface (113, 114) and the third interface (113, 114). This way a back-up connection can be provided.

15 Claims, 5 Drawing Sheets

(51) Int. Cl.
*H04L 45/28* (2022.01)
*H04W 40/22* (2009.01)
*H04W 48/14* (2009.01)
*H04W 84/12* (2009.01)

(58) Field of Classification Search
USPC .......................................................... 370/329
See application file for complete search history.

(56) References Cited

U.S. PATENT DOCUMENTS 9,210,646 B2   12/2015  Ruffini et al.

| | | |
|---|---|---|
| 2006/0053231 A1 | 3/2006 | Lange et al. |
| 2009/0245163 A1 | 10/2009 | Inoue |
| 2010/0189012 A1 | 7/2010 | Shibuya et al. |
| 2015/0305082 A1 | 10/2015 | Elliott et al. |
| 2015/0319628 A1 | 11/2015 | Elliott et al. |
| 2016/0094388 A1 | 3/2016 | Britt, Jr. et al. |
| 2016/0099830 A1 | 4/2016 | Stellick |
| 2016/0278158 A1 | 9/2016 | Van Oost et al. |
| 2016/0360430 A1 | 12/2016 | Stevens et al. |
| 2017/0359344 A1* | 12/2017 | Kaal ..................... H04L 63/06 |

FOREIGN PATENT DOCUMENTS

| | | |
|---|---|---|
| CN | 206472149 U | 9/2017 |
| JP | 2012199653 A | 10/2012 |
| JP | 2016535560 A | 11/2016 |
| WO | WO 2006071289 A1 | 7/2006 |

OTHER PUBLICATIONS

Harkins et al., "IEEE P802.11 Wireless LANs Comminus", IEEE 802.11-06/0883r0, Jul. 19, 2006, 9 pages.

* cited by examiner

WIRELESS ACCESS POINT AND METHOD FOR PROVIDING BACKUP NETWORK CONNECTIONS

This application claims the benefit, under 35 U.S.C. § 371 of International Application PCT/EP2019/057075, filed Mar. 21, 2019, which was published in accordance with PCT Article 21(2) on Oct. 2, 2019, in English, and which claims the benefit of European Patent Application No. 18305366.9, filed Mar. 30, 2018.

TECHNICAL FIELD

The present disclosure relates generally to wireless networks and in particular to provision of backup connections in such networks.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Today's world revolves around being connected to the Internet or other networks at all times. Broadband connectivity is for instance considered a basic right in Finland, France and Spain, and the European Union has issued a directive to the effect that all its citizens have a right to broadband connection. While the broadband infrastructure is constantly improving, the risk for service interruption is still present. An interruption of services is likely to cause even more problems to users in the society in general and in commercial activities in particular in the future for example because of the indispensability of access to the Internet, the Internet providing triple-play services including access to digital television, world wide web, and telephony.

It will thus be appreciated that it is important to find solutions that work towards keeping the downtime of a broadband service to a strict minimum.

A first source of service interruption is due to disruption of the broadband link for reasons of failure of the infrastructure. While service interruptions owing to breaking of a broadband link is problematic, they are typically of a random and infrequent nature. A second source of broadband service interruptions can occur when consumers move to a new address, when the broadband access method is changed (typically upgraded) or when switching from one broadband technology to another. These cases are more common than the infrastructure failure. In some cases it can take days before the broadband services are operational again. For many services, end users rely on a mobile broadband network provided through their smartphones or tablets when the local network cannot use the fix broadband connection. However, this solution works only for the device itself, not for the broad range of services that an end user can enjoy when connected to a broadband access gateway (GW). Services such as remote backup to a Network Access Server (NAS), remote home control and Internet Protocol TV (IPTV) typically cannot be used when the end user connects to a mobile network directly through the smartphone or the tablet.

Various solutions have been proposed to overcome this problem. The first solutions consisted of devices having dual xDSL type Wide Area Network (WAN) connection capabilities (e.g. Integrated Services Digital Network (ISDN) and Asymmetric digital subscriber line (ADSL)), which enabled switching from one broadband connection to the other in case of connection problems. Being rather expensive, such devices were typically deployed only in non-residential environments. A more recent solution, hybrid gateways, provided a more elegant, yet still expensive, alternative. A hybrid gateway contains a regular broadband WAN interface such as xDSL, Pon or Docsis and an additional mobile broadband interface such as 5G, 4G or 3G/LTE (Long-Term Evolution), for example via a LTE dongle. When the regular WAN connection breaks, a hybrid gateway switches over to the mobile broadband connection.

A problem with these conventional solutions is cost, product cost or network infrastructure cost, which can delay or impede their acceptance.

It will be appreciated that it is desired to have a solution that overcomes at least part of the conventional problems related to interruption of broadband services. The present principles provide such a solution.

SUMMARY OF DISCLOSURE

In a first aspect, the present principles are directed to a wireless access point including a first interface configured for communication with wireless devices in a first local network managed by the wireless access point, a second interface configured for communication with a second network, a third interface configured for communication with a second access point and at least one hardware processor configured to route traffic between the wireless devices in the first local network and the second network via the first interface and the second interface and, upon determination that communication via the second interface is not possible, connect through the third interface to the second wireless access point as a wireless device in a second local network managed by the second wireless access point and route traffic between the wireless devices in the first local network and the second network via the first interface and the third interface.

Various embodiments of the first aspect include:
That the at least one hardware processor is further configured to monitor the status of the connection with the second network to determine when communication via the second interface is impossible.
That the at least one hardware processor is further configured to, before connecting to the second wireless device, determine if a backup connection is available on a current channel of the third interface and routing traffic between the wireless devices in the first local network and the second network via the backup connection.
That the at least one hardware processor is further configured to scan channels available to the third interface to find at least the second local network.
That the at least one hardware processor is further configured to try to connect to second local networks found in said scan until access is granted to one of the second local networks, referred to as the second local network. The second local network can be a hotspot and the at least one hardware processor can be further configured to provide access credentials to the second wireless device. The second local network can further be a network provided by a telecommunication services provider or a privately owned network and the at least one hardware processor can be further configured to scan for a specific network identifier to find at least the second local network. The second local network can alternatively be a network provided by a telecommunication services provider or a privately owned network and the at least one hardware processor can be further configured to scan for a specific beacon to find at least the second local network and to send to the second wireless device a probe request including a Basic Service Set IDentifier of the first wireless device, a timestamp, and a first certificate, receive a modified probe response including a timestamp and a second certificate, verify the second certificate and connect to the second local network at a time included in the timestamp.

That the at least one hardware processor is further configured to continue monitoring the second interface to determine if broadband connection becomes operational through the second interface and then to route traffic between the wireless devices in the first local network and the second network via the first interface and the second interface.

In a second aspect, the present principles are directed to a method for providing a connection by a wireless access point in a first local network managed by the wireless access point. At least one hardware processor routes traffic between wireless devices in the first local network and a second network via a first interface configured for communication with wireless devices in the first local network and a second interface configured for communication with the second network and, upon determination that communication via the second interface is not possible, connects through a third interface to a second wireless access point as a wireless device in a second local network managed by the second wireless access point and routes traffic between the wireless devices in the first local network and the second network via the first interface and the third interface.

Various embodiments of the second aspect include:
That the method further includes monitoring a status of a connection with the second network to determine when communication via the second interface is impossible.
That the method further includes, before connecting to the second wireless device, determining if a backup connection is available on a current channel of the third interface and routing traffic between the wireless devices in the first local network and the second network via the backup connection.
That the method further includes scanning channels available to the third interface to find at least the second local network.

In a third aspect, the present principles are directed to a computer program including program code instructions executable by a processor for implementing the steps of a method according to any embodiment of the second aspect.

In a fourth aspect, the present principles are directed to a computer program product which is stored on a non-transitory computer readable medium and includes program code instructions executable by a processor for implementing the steps of a method according to any embodiment of the second aspect.

BRIEF DESCRIPTION OF DRAWINGS

Preferred features of the present principles will now be described, by way of non-limiting example, with reference to the accompanying drawings, in which.

DESCRIPTION OF EMBODIMENTS

Conventional broadband access devices, also called Access Points (APs), such as gateways have a minimum of one integrated Wireless Local Area Network (WLAN) interface. However, the majority of present day devices have at least two WLAN interfaces (dual band, tri-band, . . . ).

With the WLAN interfaces, all the necessary hardware is present to exploit, in many cases, a novel approach to restoring a broadband connection that has gone down. Indeed, while many users and equipment vendors complain about the presence of "neighbouring networks", i.e. wireless networks that interfere with the network in first location, these can be used as part of a backup solution to handle the loss of broadband connectivity in a broadband access device.

In urban areas, at least one neighbouring network can always be found and this is also the case in the majority of rural areas. The neighbouring network can be provided by any one of stakeholders such as for example:
The same operator, i.e. telecommunication services provider, as that of the broadband device in the first location.
A different operator.
A hotspot service, not linked to a telecommunication services provider (e.g. a virtual network operator such as Fon).
A private person (e.g. a company or a residential AP that cannot be linked to a known operator).

Thus, typically at least one neighbouring network can be within comfortable range of the broadband device in trouble—i.e. close enough to enable wireless communication.

As will be further described hereinafter, an idea of the present principles is to share the WLAN network of a neighbouring network to re-establish a potentially reduced or interrupted set of broadband services.

A factor making this possible is the WLAN hardware. WLAN chipsets installed on broadband access devices are physically able to function in an AP role or a in client ("STA" for STAtion) role, in some cases simultaneously. The WLAN chipsets can be loaded with different software to perform these different functions. From a software point of view, the majority of WLAN chipsets support some form of WLAN client (STA) mode, which can be added to the functionality of the broadband access device.

With these building blocks (WLAN chipset hardware+ WLAN client driver) in place, a broadband access device can apply the same detection algorithm as is used on the hybrid broadband GWs that have an LTE dongle as a backup connection solution as described in the background section.

Figure 1:
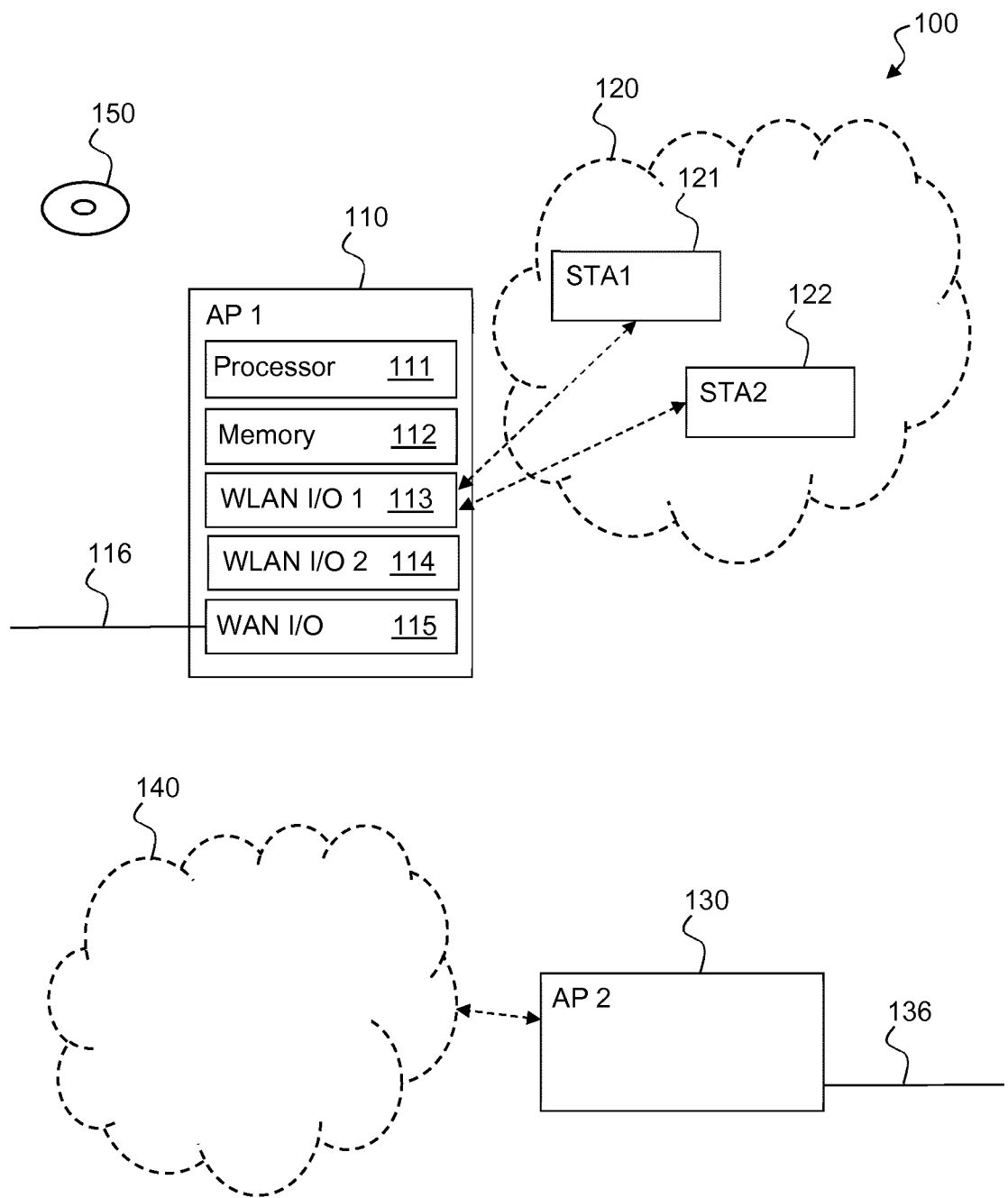
FIG. 1 illustrates an exemplary system according to an embodiment of the present principles.

FIG. 1 illustrates an exemplary system 100 according to an embodiment of the present principles. The system 100 includes a first broadband access device (AP1) 110, exemplified by a gateway, and a second broadband access device (AP2) 130.

AP1 manages a first WLAN 120 that for exemplary purposes includes at least a first client device (STA1) 121 and a second client device (STA2) 122, but it should be understood that the first WLAN 120 can include fewer (even zero) or more devices. AP1 is operative to provide broadband connections to the client devices 121, 122 through (wired or wireless) Wide Area Network (WAN) connection 116 using any suitable connection technology.

AP1 110 includes at least one hardware processor ("processor") 111, memory 112, a first and a second Wireless Local Area Network (WLAN) interface 113, 114, which can use distinct frequency bands (such as 2.4 GHz and 5 GHz) and are implemented at least partly in hardware, and a hardware WAN interface 115. It will be appreciated that the WLAN interfaces 113, 114 can be implemented in a single physical interface in case this interface is able to function both in the AP role and in the client (STA) role simultaneously and that a WLAN interface can implement multiple virtual WLAN interfaces, for example to manage a home WLAN and a hotspot using the same physical WLAN interface. It will also be appreciated that both client devices STA1 121, STA2 122 are illustrated as being connected to the first WLAN interface 113 for illustrational reasons only; in case at least one of the plurality of WLAN interfaces 113, 114 can function in both roles (or in case there are more than two WLAN interfaces), there is no need for the client devices to connect to the same WLAN interface.

The client devices STA1 121, STA2 122 are beyond the scope of the present principles and can be any suitable conventional client devices.

AP2 130 manages a neighbouring WLAN 140 to which it provides broadband access via backhaul or WAN connection 136. AP2 130 can be implemented like AP1 110, but can also in some embodiments be a conventional broadband access device.

The processor 111 is configured to monitor the broadband connection passing through WAN connection 116 and, if this connection becomes unavailable, enable the WLAN client mode on at least one WLAN interface 113, 114 and use this interface to search for a neighbouring network 140 to which it can connect in order to obtain at least a limited broadband connection.

Figure 2:
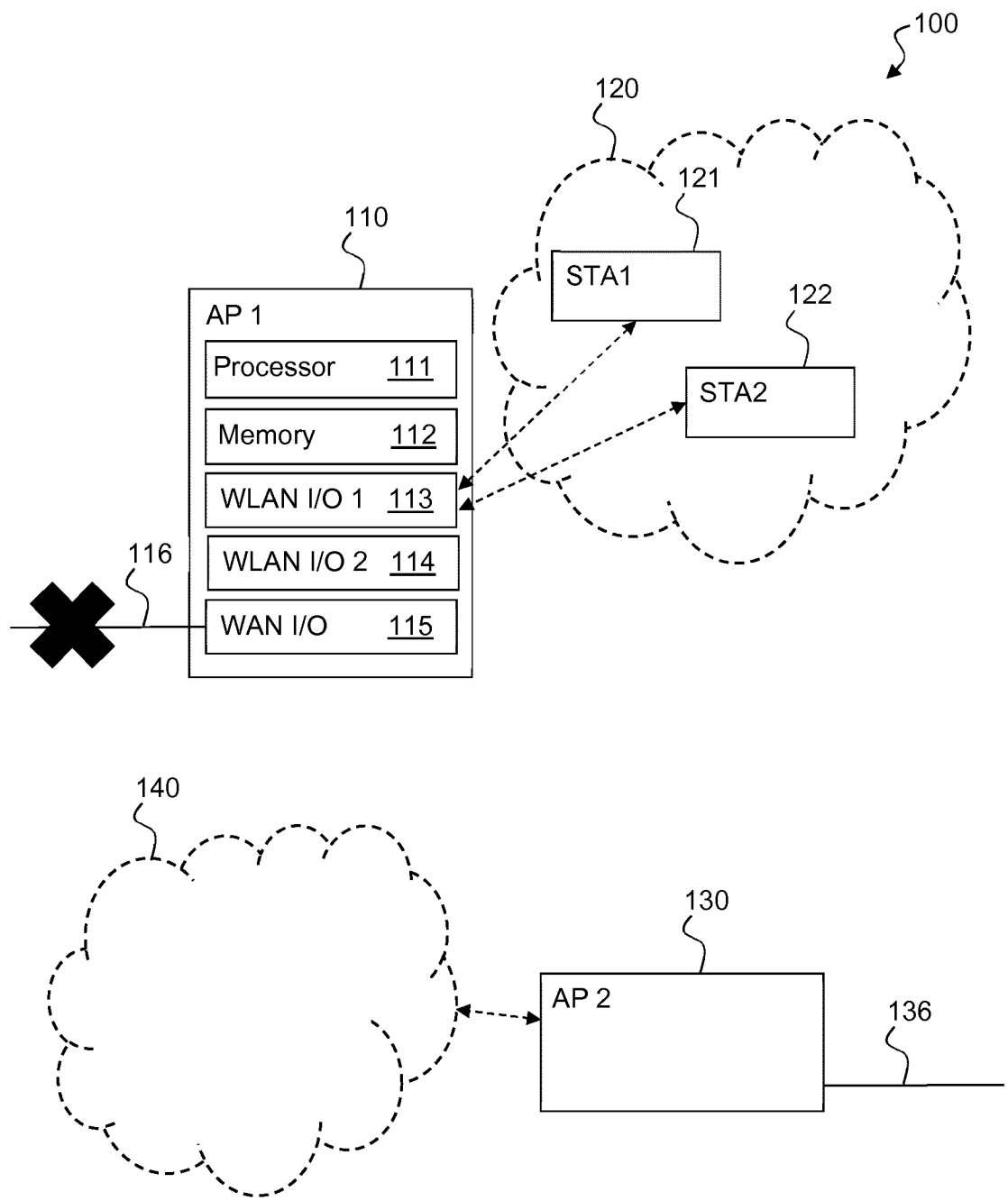
FIG. 2 illustrates the exemplary system when a broadband connection is unavailable.

FIG. 2 illustrates the exemplary system 100 when the broadband connection via WAN connection 116 is unavailable.

Figure 3:
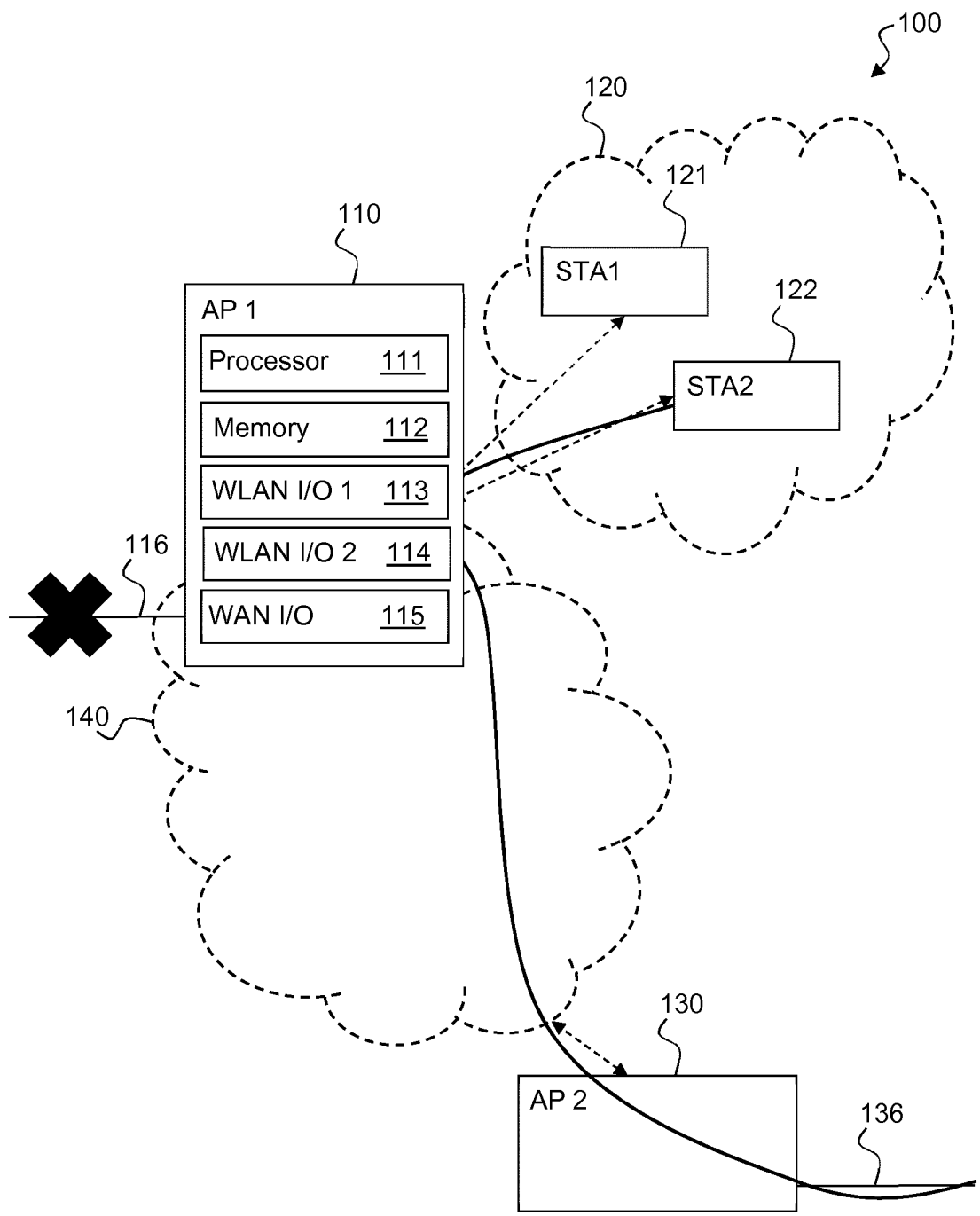
FIG. 3 illustrates the exemplary system when a broadband connection is obtained via a neighbouring network.

FIG. 3 illustrates the exemplary system 100 when a broadband connection for the first WLAN 120 is obtained via the neighbouring network 140. The neighbouring network 140 then includes AP1, which is illustrated by 'cloud' 140 including AP1. The client devices STA1, STA2 can now, as before, communicate with the first WLAN interface 113 working in the AP role. AP1 transfers received traffic from the client devices through the second WLAN interface 114 working in the client role so that AP2 'sees' AP1 as a 'client', and AP2 forwards the traffic through the WAN connection 136. Traffic can also go the opposite way, from WAN connection 136 to AP1 to the client devices The thick line between STA2 and WAN connection 136 is intended to illustrate this. The connection via neighboring network 140 and AP2 to WAN 136 is hereinafter referred to as the backup connection.

Non-transitory storage media 170 stores instructions that, when executed by processor 111, perform the functions of AP1 as further described hereinafter with reference to FIG. 4.

Figure 4:
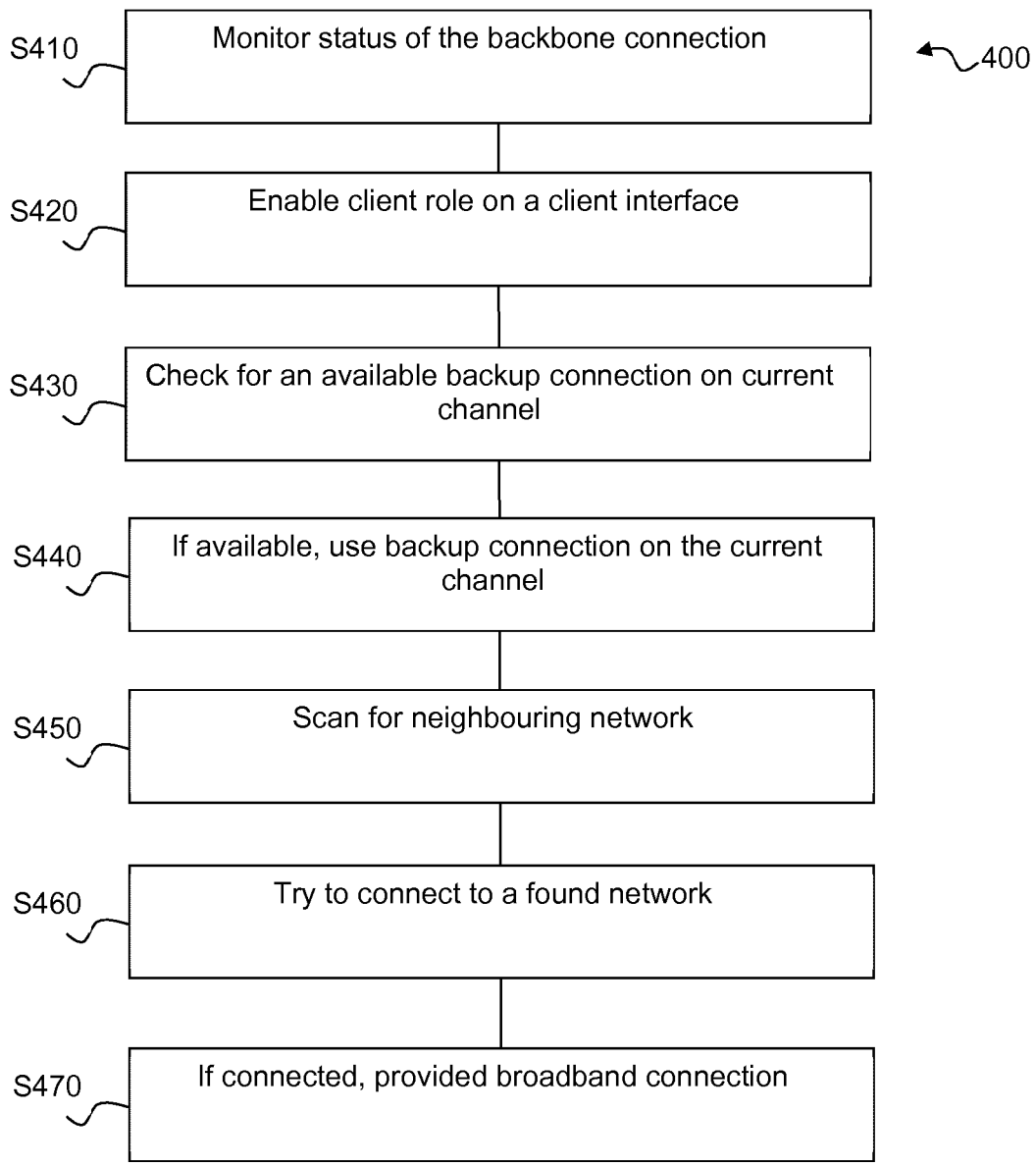
FIG. 4 illustrates an embodiment of a method for obtaining a broadband connection according to the present principles.

FIG. 4 illustrates an embodiment of a method 400 for obtaining a broadband connection according to the present principles.

In step S410, the processor 111 of AP1 110 monitors the status of the broadband connection (also known as the Wide Area Network (WAN) connection) passing through the WAN connection 116. The broadband connection is typically a combination of a physical and a logical interface. If either one breaks, the connection is lost. It is thus preferred to monitor the logical connection (e.g. Point-to-Point Protocol over Ethernet (PPPoE) or Internet Protocol over Ethernet (IPoE)) interface rather than the physical connection, to establish if the WAN connection is available or unavailable.

Once it is established in step S410 that the WAN connection is unavailable ("broken," "down"), the processor 111, in step S420, enables, as is well known in the art, the client role on a WLAN interface 113, 114, which will be known in at least the description of FIG. 4 as the STA interface. To do this, it may be necessary to hand over (transfer) one or more client devices (e.g., client devices STA1 121 and STA2 122) to a different client interface (e.g., from WLAN I/O 114 to WLAN I/O 113). This may be the case if a client interface is unable to function in both the AP role and the client role at the same time; then, before one of the WLAN interfaces is switched to the client role, any client devices already attached to that interface will be handed over from that interface to the WLAN interface remaining in the AP role, thereby avoiding communication disruption between these devices and the AP.

In step S430, the processor 111 checks, via the STA interface 113, 114, for an available backup connection on the current channel; the AP can for example scan for presence of a neighbouring wireless network on the same radio frequency channel as that used in its own wireless network. This is because while the WAN is down, the WLAN is not and some WLAN services such as file sharing between the client devices of the AP might still be used. If a backup connection is found on the current channel then this is used, in step S440, to provide broadband connection; it is not necessary to reconnect the current client devices 121, 122 in the first WLAN 120.

If no backup connection is found on the current channel, in step S450, the processor 111 performs, via the STA interface 113, 114, a scan on available channels for at least one neighbouring network.

As already described, neighbouring networks can for example be provided by:

The same operator as that of the broadband device in the first location.

A different operator.

A (public) hotspot service, not linked to a telecommunication services provider (e.g. a virtual network operator such as Fon).

A private person (e.g. a company or a residential AP that cannot be linked to a known operator).

It can be seen that there are two distinct possibilities:

The neighbouring network is a hotspot, e.g. provided by a virtual network operator.

The neighbouring network is provided by a telecommunication services provider or is a privately owned network.

In step S460, the processor 111 tries to connect to the neighbouring networks found, depending on the kind of neighbouring network found, as described hereinafter. If the processor 111 succeeds in connecting to a neighbouring network, then in step S470 a broadband connection is provided to devices in its WLAN 120; if not, no broadband connection can be established and the method ends, but the processor may continue to monitor the state of the lost connection to the WAN, and may restore the state of connection before the connection loss when the connection is restored.

Accessing a neighbouring network provided by a hotspot is simple, if for example the operator of AP1 has established a partnership with the corresponding virtual operator or if the hotspot otherwise accepts the access attempt, e.g. the hotspot provides public access ('public hotspot'). Such a partnership can be exploited in two ways. First, the virtual operator is added as a service (e.g. FON service) to the broadband devices (including AP1) of the operator. Second, a device/service set of credentials specific to the virtual operator is installed on the broadband devices of the broadband operator so that in client mode, a broadband device can access the hotspot of the virtual network operator.

Fon is provided as an example. An AP running the Fon service could install client credentials and establish a connection to the Fon network of a neighbour broadband device running the Fon service when its own broadband connection goes down.

The case where the neighbouring network is provided by a telecommunication services provider or is a privately owned network, i.e. without the use of a public hotspot, preferably includes an identification step as these networks may not be provided by the operator whose broadband device lost the broadband connection. Typically, these networks will not allow access without a suitable credential set and/or service agreement in place. In other words, to access such a neighbouring network, proper access credentials should be provided. As will be seen, this can be done in different ways.

In one embodiment, at least two broadband service providers have come to an agreement to allow APs of the other access to their own networks in certain cases, such as when their own broadband connection is down. To this end, an AP can provide an "emergency" SSID that uses Wi-Fi Protected Access II (WPA2) enterprise. An AP can then connect to such an SSID and be authenticated by a Remote Authentication Dial-In User Service (RADIUS) server that holds the necessary verification capacities to authorize all the different operators that participated in the agreement. It will be appreciated that this applies also in case the two WLANs are provided by the same broadband service provider; if so, the agreement is not necessary and the authentication can be simplified.

Figure 5:
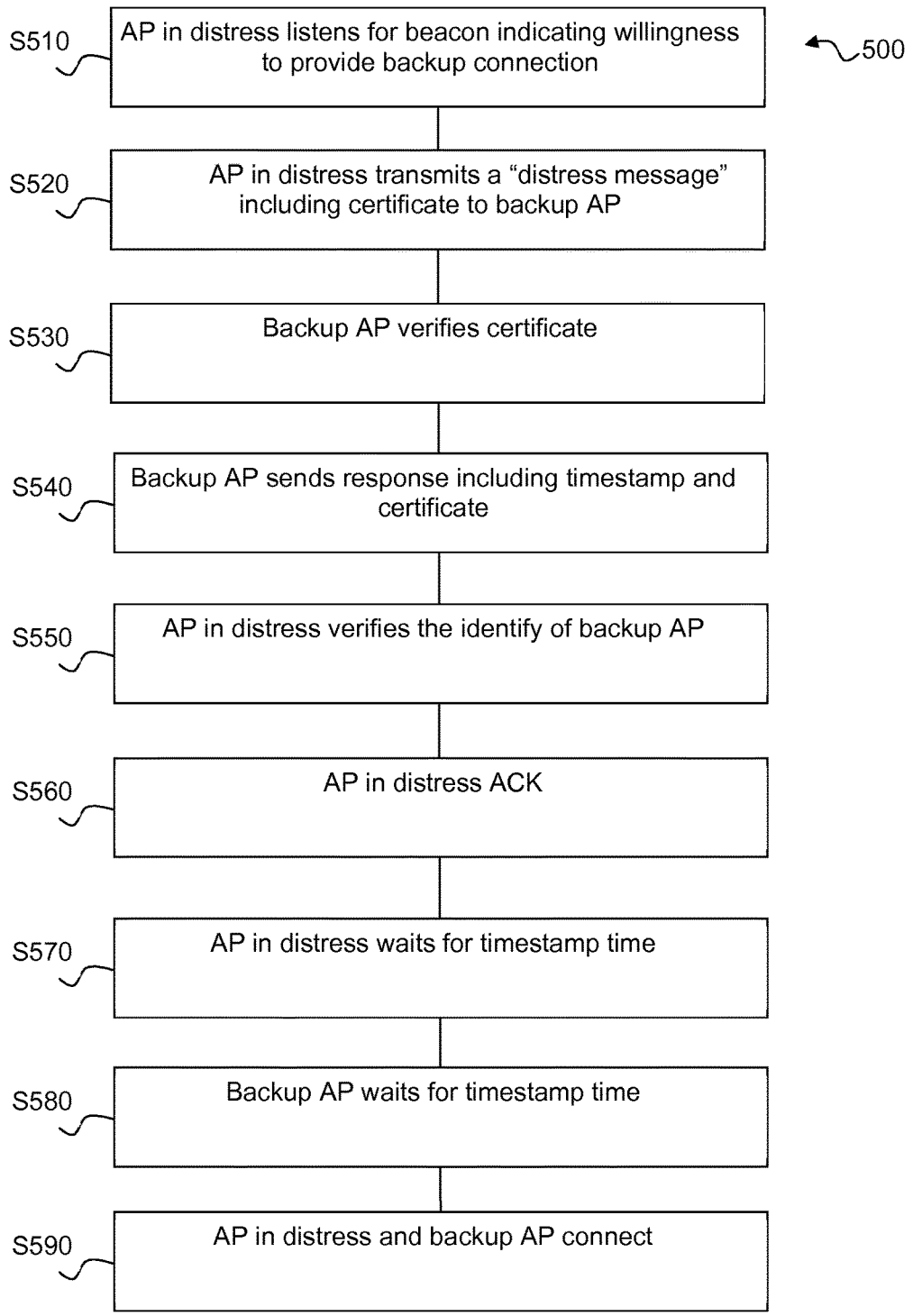
FIG. 5 illustrates an embodiment of a connection method according to the present principles.

In another embodiment, whose method 500 is illustrated in FIG. 5, the Wi-Fi Protected Setup (WPS) protocol of the Wi-Fi Alliance is used. WPS uses a pushbutton configuration mechanism that does not require any credentials. However, for WPS to work in the context of the present principles, the regular WPS protocol needs to be modified, as follows.

First, APs that are willing to provide a backup WAN connection to another AP, should announce this via their beacons by including a vendor specific IEEE 802.11 Information Element (IE), which carries tag number 221 and typically uses a MAC address as identification. This MAC address (6 byte) can be chosen freely but preferably remains linked to the specific backup service of the present principles. For instance, 0x101331AABBCC is a valid vendor specific IE tag for which the first 3 bytes (101331) could indicate the service provider (in this case Technicolor) and the following 3 bytes (AABBCC) could indicate the service.

In step S510, AP1 listens for such a beacon.

In step, S520, AP1 notifies the AP of the neighbouring network (AP2), for example by transmitting a "distress message" that can be a modified version of an 802.11 unicast probe request in order to identify itself and to notify the neighbouring AP that a backup connection is needed. Thus, the AP without broadband connection (AP1) could send the following information to the neighbouring AP (AP2):
- its own Basic Service Set IDentifier (BSSID),
- a timestamp, and
- an X.509 (Transport Layer Security, TLS) certificate (including for example its Universally unique identifier, UUID).

In step S530, AP2 then verifies the X.509 certificate using a corresponding root certificate. Upon successful verification, AP2 then answers, in step S540, with a modified probe response to AP1 as already described, further including a timestamp that marks the point at which the neighbouring AP will start the Wi-Fi Protected Setup-Push Button Configuration (WPS-PBC) session. Further, AP2 also sends, possibly included in the modified probe response, its X.509 certificate so that the AP1 can verify the identity of AP2.

In step S550, AP1 verifies the identify of AP2 and, upon successful verification, sends, in step S560 an ACK frame to AP2, the ACK frame including its vendor specific IE with confirmation of the timestamp and its BSSID. AP1 then waits, in step S570, for the time of the timestamp to start WPS-PBC.

Upon reception of the ACK frame, AP2 waits, in step S580, for the time of the timestamp to start WPS-PBC.

Using WPS-PBC, in step S590, the APs are able to connect using a WPS handshake during which the "device identifier" of AP1 is again checked by AP2. If this device ID does not match a predefined device, e.g. "operatorID@indistress", the session is aborted.

Once a connection is active, broadband services can be become operational via the WLAN link that now acts as WAN connection, as illustrated in FIG. 3.

Firewalling and LAN/WAN separation is beyond the scope of the present principles.

As already mentioned, in case no suitable candidate appears, then no broadband connection can be offered. The STA interface 113, 114 can still periodically scan available channels to find a candidate backup solution.

The processor 111 preferably also continues to monitor the status of the regular broadband connection, i.e. the one via WAN connection 116. If this regular broadband connection becomes operational again, then it can be used to provide broadband connectivity and the STA interface may be changed to work in the AP role.

As will be appreciated, the present principles can provide a backup connection by having an AP connect as a client in a neighbouring network.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A first wireless access point (AP) comprising:
 a first wireless local area network (WLAN) interface and a second WLAN interface, the first WLAN interface and the second WLAN interface configured for wireless communication with WLAN devices in a first WLAN;
 a first link to a wide area network (WAN);
 a network interface configured for communication with the WAN, via the first link;
 at least one processor configured:
  to route traffic between WLAN devices in the first WLAN and the WAN via the first WLAN interface and/or the second WLAN interface and the first link, the first and/or the second WLAN interface being in Access Point mode, AP mode, and the WLAN devices in the first WLAN being in client mode;
  to monitor availability of the first link to the WAN;
  when the first link to the WAN is unavailable:
   to keep the first WLAN interface in AP mode;
   to enable client mode for the second WLAN interface and to connect the second WLAN interface to a second WLAN provided by a second wireless AP having a second link to the WAN; and
   to route traffic between the WLAN devices in the first WLAN and the WAN, via the first WLAN interface in AP mode, the second WLAN interface in client mode connected to the second WLAN and the second link of the second wireless AP to the WAN.

2. The first wireless AP according to claim 1, wherein the at least one processor is further configured to, when the first link to the WAN is unavailable and when at least one of said WLAN devices in the first WLAN is attached to the second WLAN interface, before the enabling of the client mode for the second WLAN interface, transfer said at least one of said WLAN devices in the first WLAN attached to the second WLAN interface from the second WLAN interface to the first WLAN interface.

3. The first wireless AP of claim 1, wherein the at least one processor is further configured to scan, using the second WLAN interface in client mode, for presence of at least one second WLAN.

4. The first wireless AP of claim 3, wherein the at least one processor is further configured to try to connect to said at least one of said second WLAN found in said scan until access is granted to one of said at least one second WLAN, and to select one of said at least one second WLAN to which access is granted, as said second WLAN.

5. The first wireless AP according to claim 4, wherein the at least one of said second WLAN found in said scan, to which the at least one processor is configured to try to connect, is a hotspot and wherein the at least one processor is further configured to provide access credentials when trying to connect to said at least one of said second WLAN found in said scan.

6. The first wireless AP of claim 5, wherein the second WLAN is a network provided by a telecommunication services provider or a privately owned network and wherein the at least one processor is further configured to scan for a specific network identifier to select said one of said at least one second WLAN found in said scan having said specific network identifier.

7. The first wireless AP of claim 5, wherein the second WLAN is a network provided by a telecommunication services provider or a privately owned network and wherein the at least one processor is further configured to scan for a specific beacon to select said one of at least one of said second WLAN and to:

send on the selected second WLAN a probe request comprising a Basic Service Set Identifier, BSSID, of the first wireless AP, a timestamp, and a first certificate;

receive a modified probe response comprising a timestamp and a second certificate;

verify the second certificate; and connect to the selected second WLAN at a time included in the timestamp.

8. The first wireless AP of claim 1, wherein the at least one processor is further configured to continue monitoring the first link to the WAN to determine if said first link becomes available and when said first link becomes available to route traffic between the WLAN devices in the first WLAN and the WAN via the first WLAN interface and the network interface configured for communication with the WAN, and to enable AP mode for the second WLAN interface.

9. A method implemented by a first wireless access point (AP) said method comprising:

routing traffic between wireless local area network (WLAN) devices in a first WLAN and a wide area network, WAN, via a first WLAN interface and/or a second WLAN interface and a first link between the first wireless AP and the WAN, the first and/or the second WLAN interface being in Access Point mode, AP mode, and the WLAN devices in the first WLAN being in client mode;

monitoring availability of the first link to the WAN;

when the first link to the WAN is unavailable:

keeping the first WLAN interface in AP mode;

enabling client mode for the second WLAN interface and connecting the second WLAN interface to a second WLAN provided by a second wireless AP having a second link to the WAN; and routing traffic between the WLAN devices in the first WLAN and the WAN via the first WLAN interface in AP mode, the second WLAN interface in client mode connected to the second WLAN and the second link of the second wireless AP to the WAN.

10. The method according to claim 9, further comprising, when the first link to the WAN is unavailable and when at least one of said WLAN devices in the first WLAN is attached to the second WLAN interface, before the enabling of the client mode for the second WLAN interface, transferring said at least one of said WLAN devices in the first WLAN attached to the second WLAN from the second WLAN interface to the first WLAN interface.

11. The method of claim 9, further comprising scanning, using the second WLAN interface in client mode, for presence of at least one second wireless network.

12. The method of claim 11, further comprising trying to connect to said at least one of said second WLAN found in said scanning until access is granted to one of said at least one second WLAN, and to select one of said at least one second WLAN, and selecting one of said at least one second WLAN to which access is granted, as said second WLAN.

13. The method according to claim 12, wherein the second WLAN is a hotspot and wherein the method further comprises providing access credentials when trying to connect to said at least one of said second WLAN found in said scanning.

14. A computer program comprising program code instructions executable by a processor for implementing the steps of a method according to claim 9.

15. A computer program product stored on a non-transitory computer readable medium and comprising program code instructions executable by a processor for implementing the steps of a method according to claim 1.

* * * * *